Nov. 24, 1964   J. P. CHISHOLM   3,158,862
WIDE-ANGLE ELECTRICALLY-MODULATED REFLECTOR
Filed Aug. 24, 1961   3 Sheets-Sheet 1

INVENTOR.
JOHN P. CHISHOLM
BY
Alexander & Dowell
ATTORNEYS

United States Patent Office 3,158,862
Patented Nov. 24, 1964

3,158,862
WIDE-ANGLE ELECTRICALLY-MODULATED REFLECTOR
John P. Chisholm, Buffalo, N.Y., assignor to Sierra Research Corporation, Buffalo, N.Y., a corporation of New York
Filed Aug. 24, 1961, Ser. No. 133,721
4 Claims. (Cl. 343—18)

This invention relates to radar-target frequency-shift reflector means, and particularly to improved high-gain wide-angle reflector means.

In the radar tracking of targets employing frequency-shift reflection techniques, there are a plurality of effects which make the interpretation of received echo signals more difficult and which introduce errors reducing tracking accuracy. For example, in precision aircraft landing systems a phenomenon known as target scintillation is particularly disturbing, this scintillation effect referring to the shifting-about on the surfaces of an aircraft of the principal reflective areas as the aircraft's attitude in space varies as viewed from the location of the radar. The apparent tracking center, the locus of the principal wave reflection, wanders all over the aircraft and leads to a false impression that the aircraft is itself wandering correspondingly in space. In landing systems where the accuracy of the system must be maintained within a very few feet, for instance in aircraft carrier landing systems, this apparent wandering is of major concern. One basic way to eliminate target scintillation is to make one locus on the aircraft distinctively different from all others by using a beacon having identifiable transponder capabilities, in the manner set forth in copending application, Serial Number 66,547, filed November 1, 1960, entitled Frequency-Shift Reflection System, now Patent No. 3,108,275. It is to this type of reflector that the improvements of the present invention are directed for the purpose of increasing the angular response of the reflectors without sacrificing any of the unique advantages characterizing the reflector of the above identified copending application.

It is a principal object of this invention to provide an improved radar reflector system having, at the same time, both high-gain and wide-angle characteristics. These two characteristics are generally considered to be mutually exclusive since the gain of an antenna is a function of the narrowness of its beam, so that a wide-angle antenna is usually a low-gain antenna. However, the present invention teaches novel combinations of reflector horns and focusing means by which high-gain and wider angular coverage are simultaneously obtained, thereby greatly increasing the practicability of the resulting system. Broadly, the novel combinations include a plurality of frequency-shift reflectors cooperatively associated with energy focusing means for providing a composite wider angular characteristic than the angular coverage of any of the individual reflectors. In this combination, each frequency-shift reflector comprises a horn terminated in an electrical switching device, the switching condition of which is controlled by a radio-frequency oscillator for electrically modulating the reflectivity of the horn at an R.F. rate.

These reflectors, when illuminated by a remote radar, return reflections which include a component at the frequency $fr$ of the radar, plus side band components of this frequency modulated at the frequency $fm$ of the reflector-coupled oscillator, i.e. $fr+fm$, $fr-fm$. In addition, other reflective surfaces of the aircraft carrying the present reflector system will reflect large amounts of energy at the radar frequency $fr$, but these large amounts of energy will be subject to scintillation effects as the attitude of the aircraft shifts in space. It is therefore necessary to the success of the entire system to discriminate between the modulated received signals and the unmodulated reflections returning at the radar frequency $fr$. The above-mentioned copending application describes a system including a radar and a remotely located frequency-shift reflection target in which the frequency-rejection capabilities of the radar receiver bandwidth are selectively used to eliminate from the received signals the radar transmitted components $fr$ and one of the side bands, either $fr+fm$ or $fr-fm$, while passing the other selected side band to be amplified.

In the working embodiment of the present invention, an X-band radar was used with a frequency $fr$ of about 9000 megacycles. The oscillator frequency $fm$ in the frequency-shift reflector was variously set at radio-frequencies between 30 and 100 megacycles so as to provide rejections of between 50 and 100 decibels for the non-selected reflected frequency components.

The present system is not limited to uses connected with the automatic landing of aircraft, but is capable of a number of other uses, for example, marine navigation aids.

It is another principal object of the present invention to provide a frequency-shift reflector assembly comprising a plurality of reflecting horns combined with cooperating radiation-focusing means to provide a composite assembly presenting a relatively large aperture area having a relatively wide-angle characteristic.

Basically, the practical difference between the present reflector assembly and an antenna functioning per se as a reflector for radar signals resides in the fact that on an antenna its gain and its angular coverage are inversely related, but in a reflector assembly it is possible to combine several antenna-type reflectors to provide a composite assembly wherein gain and angular coverage can be independently specified. In aircraft target beacon applications high-gain is important because enough of the incident-signal power must be reflected to the radar receiver to provide a strong signal under adverse weather conditions at a reasonably great range, bearing in mind that all losses in the assembly are doubled since the energy goes through twice; and wide-angular coverage is essential to ensure substantially continuous contact between the radar and the reflector beacon in the aircraft despite changes in attitude of the latter while approaching, i.e. piching and yawing.

Nor are gain and angular coverage the only factors. Particularly in aircraft applications, size and shape, weight, windage, and complexity affecting reliability are paramount factors, and it is a major object of this invention to provide an efficient assembly when judged by these and other significant factors.

A further major object of the invention is to provide, in combination with several electrically-modulated reflector horns, radiation-focusing means which can receive energy substantially arriving in a plane front and focus it into one or another of the horns depending upon the direction from which the radiation arrives, the focusing means then receiving the reflection from that horn and focusing it back into a plane re-radiated front.

Another object of the invention is to provide in the present assembly a focusing means, which may be either a lens or a shaped reflecting dish, which translates the radiation from a plane front to substantially a point or a line at the mouth of a horn, and vice versa. Specific embodiments of lenses are described below by way of illustration, one of which is a Luneberg lens, U.S. Patent 2,849,713, and another of which is an essentially-parabolic dish.

Other objects and advantages of the invention will become apparent during the following discussion of the drawings, wherein:

FIG. 2 is a schematic diagram showing the placement of a single modulation reflector horn behind a Luneberg lens, the angular coverage pattern of this combination being shown in FIG. 2a;

FIG. 4 is a schematic diagram showing the placement of a single modulated horn at the focal point of a parabolic dish, the angular coverage of this combination being shown in FIG. 4a;

FIG. 6 is a schematic diagram of another type of known radio-frequency lens in front of several reflector horns and producing a directional pattern as shown in FIG. 6a;

Figure 1:
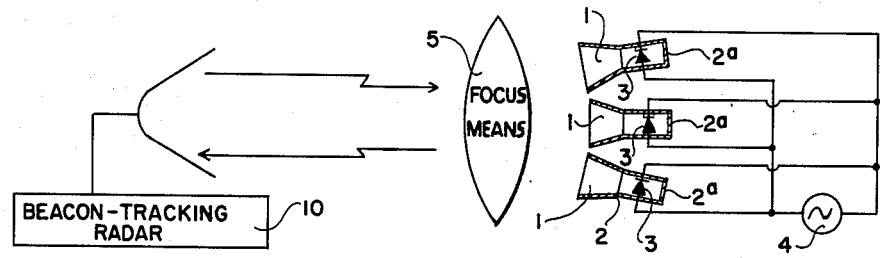
FIG. 1 is a schematic block diagram of a reflector assembly according to the present invention cooperating with a radar.
Figure 7:
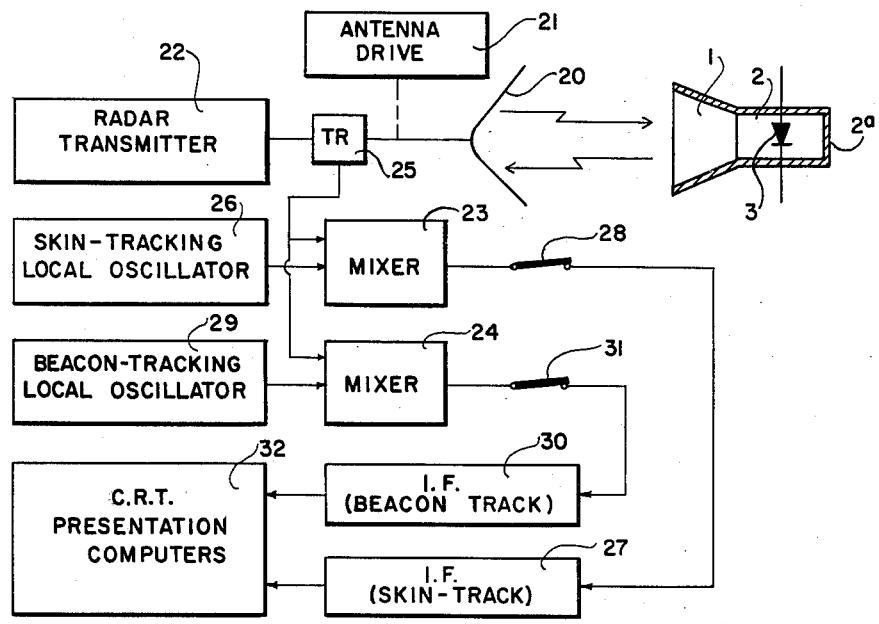
FIG. 7 is a block diagram illustrating a dual-capacity radar suitable for use in connection with the present invention for either skin-tracking, or beacon-tracking a frequency-shift reflector.

Referring now to the drawing, FIGS. 1 and 7 show waveguide horns bearing the reference numeral 1, each horn shown flared at one end and each horn, although non-flared horns also work satisfactorily, being coupled at the other end to a short section of wave guide 2 having a closed end 2a. It is not necessarily a requirement that the end 2a of the wave guide be closed, in view of the fact that by properly selecting the length and shape of the wave guide connected with the horn the end of the wave guide could also be left open. The cavity formed by the wave guide 2 need not be tuned to resonance, although a resonant cavity is within the scope of the present invention. These wave guide techniques are believed to be well understood in the prior art.

A short-circuiting means is shown across the wave guide 2 and comprising for purposes of present illustration a semiconductor crystal 3 which can be biased on or off by the application of voltage across the crystal. A simple oscillator generally designated by the reference numeral 4 is coupled across each diode for generating such bias, in the manner more fully described in the above-mentioned copending patent application.

The horn 1 and the wave guide 2 are very small when used in connection with microwave techniques. The aperture of the horn used to receive and re-radiate X-band frequencies even when flared has an aperture dimension of only 2" x 3", although smaller apertures can be used if a lesser range is tolerable, or where several horns are used in a composite assembly.

The details of the horns, short-circuiting means and oscillator connections described above are more fully described in the above-mentioned copending patent application and are not, per se, the subject of the present disclosure.

This disclosure teaches the combination of a plurality of frequency-shift reflector horns with radiation-focusing means 5 to provide a high-gain reflective assembly having a wide-angle coverage as compared with the angular coverage of one horn only, FIG. 1 representing a generalization of the present novel combination and also showing the frequency-shift reflector assembly in operative relationship with a radar 10.

Figure 2:
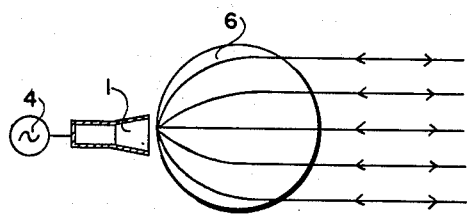
Figure 3:
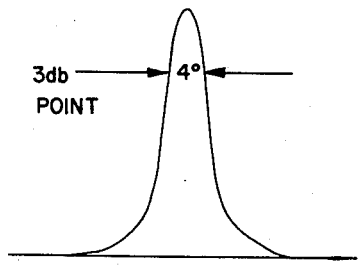
FIG. 3 is a diagram similar to FIG. 2 but showing a plurality of modulated reflectors behind the Luneberg lens, the angular coverage patterns of the individual horns being shown in superimposed relation in FIG. 3a and the composite effect of these patterns being shown in FIG. 3b.
Figure 3:
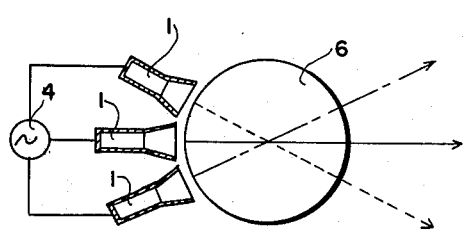
Figure 3B:
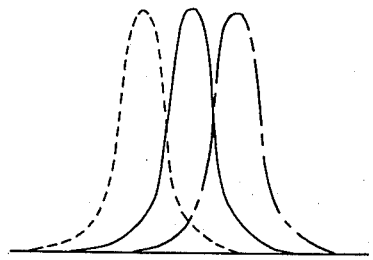
Figure 3B:
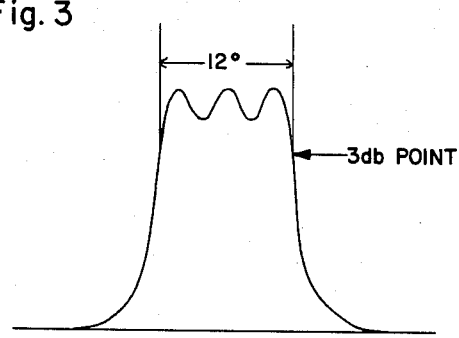

A Luneberg lens 6 having the focusing characteristics of the lens shown in U.S. Patent 2,849,713 is shown schematically in FIGS. 2 and 3 which represent a preferred embodiment of the present invention, this lens 6 focusing a collimated radiation entering one side of the lens to a point on the diametrically opposite side thereof, and vice versa as shown in FIG. 2. With only a single reflector horn 1 combined with a 12" diameter lens a beam width of only about 4° is obtained as shown in FIG. 2a as measured at a point 3 decibels down from the peak. This angular coverage of only 4° is entirely unsatisfactory for use in an automatic landing system for aircraft. However, by using a plurality of horns, the radiation arriving from other directions than straight ahead can be utilized to provide a composite angular coverage as shown in FIG. 3b which is equal approximately to the sum of the individual angular coverages as shown in FIG. 3a. Since FIG. 3 shows three reflector horns, the angular coverage would be about 12°. The addition of a fourth horn would increase the coverage to 16°, and a fifth horn would increase it to 20°. Obviously, these increases result from the fact that a Luneberg lens is symmetrical and has the same focusing characteristic regardless of which direction the radiation comes from. For example, another row of three horns stacked on top of the three shown in FIG. 3 would provide an overall angular coverage of 12° horizontally and 8° vertically, assuming that the rectangular opening of each horn were square. The angles shown in FIG. 3 are exaggerated for the sake of emphasis.

Figure 4:
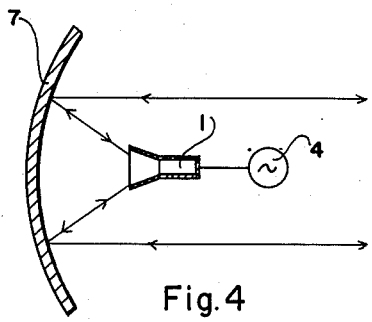
Figure 4A:
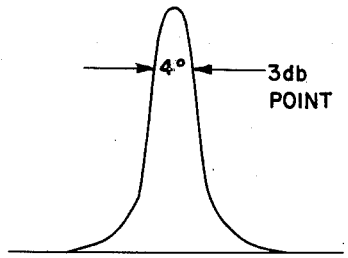
Figure 5:
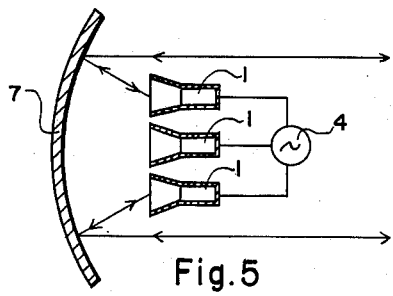
FIG. 5 is a schematic diagram similar to FIG. 4 but showing a plurality of reflector horns clustered in the vicinity of the focal point of a focusing dish, FIG. 5a showing the resulting composite angular coverage pattern.
Figure 5A:
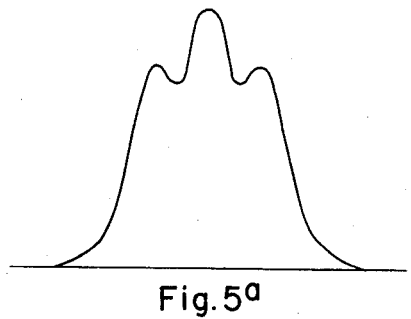

FIG. 4 shows an assembly similar to FIG. 2, but wherein the Luneberg lens 6 is replaced by a reflecting and focusing dish 7. The dish 7 shown in FIG. 4 can be parabolic since only a single horn 1 is used therewith, but as shown in FIG. 4a the angular coverage is only about 4°. In order to increase this coverage more horns 1 are added as shown in FIG. 5 which means that the dish 7 must be modified to broaden its focus to include the additional width of the added horns, or alternatively, poorer performance must be tolerated in the outermost horns due to their being offset from the focal point of the parabolic dish. Modification of the dish to widen its focus is within the skill of the art at present. The use of a dish with multiple horns provides a composite pattern of the type shown in FIG. 5a wherein the angular coverage is considerably widened as compared with that shown in FIG. 4.

Figure 6:
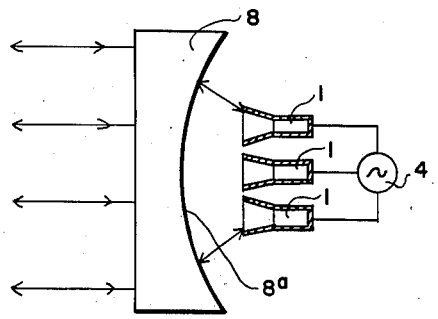
Figure 6A:
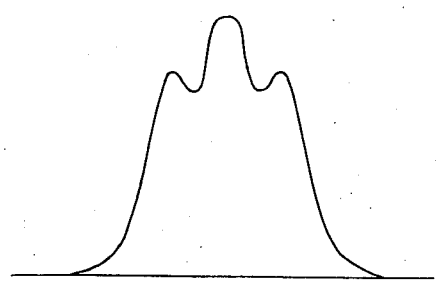

FIG. 6 shows still another embodiment wherein a lens 8 of the general type referred to in U.S. Patents 2,562,277 and 2,736,894 is used, this type of lens comprising a plurality of spaced flat plates having a composite contour 8a formed by the edges of the plates, which contour is convex or concave depending on the type of focusing desired. In the latter patent it is specifically taught that the lens is capable of providing either a point-focus or a line-focus, the latter type of focus being employed to cooperate with the plurality of reflector horns 1 located behind the lens 8 so as to provide a widened angular coverage as shown in FIG. 6a.

The prior art shows many other types of focusing means which can be used to advantage with frequency-shift reflector horns to provide other embodiments of the present invention within the coverage of the appended claims.

Figure 8:
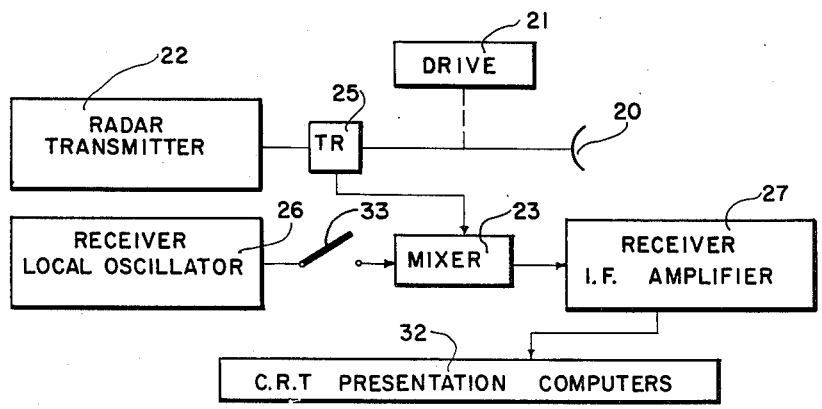
FIG. 8 is a block diagram illustrating another embodiment of a radar suitable for use in the present system and somewhat simpler than the radar of FIG. 7.

FIGS. 7 and 8 show for purposes of illustration suitable radar systems for use with the present reflector assembly, wherein in FIG. 7 the radar comprises an antenna 20, the position of which can be controlled by a suitable antenna drive 21, and the antenna being coupled both with the radar pulse transmitter 22 and a simplified representation of a radar receiver comprising two different mixers 23 and 24, the coupling to the antenna being accomplished through a conventional TR box 25. The mixer 23 is connected to receive power from a local oscillator 26 and is coupled to an IF strip 27 through a switch 28, the purpose of which will appear presently. The local oscillator 26 and the IF strip 27 are tuned to provide ordinary radar tracking, referred to herein as skin-tracking; meaning that the transmitted pulse is reflected back from the skin of the aircraft, is mixed with the signal from the local oscillator 26, and passes through the IF strip 27 in the conventional manner. The other mixer 24 is used for beacon-tracking and is connected to receive a signal from a beacon-tracking local oscillator 29 and to deliver a mixed output signal to a beacon tracking IF strip 30, the mixer 24 being coupled with the IF strip 30 by way of a switch 31. The beacon-tracking local oscillator 29 and the IF strip 30 can be similar respectively to the oscillator 26 and the IF strip 27 except that they are tuned to a different frequency separated therefrom by the frequency of the oscillator 4 in the frequency-shift reflector assembly which is being interrogated. Thus, when the switch 28 is closed and the switch 31 is open, the radar performs a pure radar function and indicates the position of aircraft merely by the reflection of the transmitted pulse at frequency $fr$ from the skin of the aircraft, the block diagram including a unit 32 comprising a cathode ray tube presentation and computers. On the other hand, if the switch 28 is open and the switch 31 is closed, no indication will be presented on the unit 32 of any signals which are reflected in the normal manner of a radar from any object whether it be the skin of an aircraft or other stationary or moving targets. Instead, the local oscillator 29 and the IF strip 30 are tuned in such a manner that only signals received at the radar and having a frequency, of $fr+fm$ or $fr-fm$, displaced from the frequency $fr$ of the pulse transmitter 22 by an amount equal to the frequency $fm$ of the frequency-shift reflector oscillator 4 will be presented on the unit 32. Alternatively, if both the switches 28 and 31 are closed, both signals are presented simultaneously on the presentation units.

FIG. 8 shows a block diagram of a radar wherein parts which are similar to those in FIG. 7 bear the same reference characters. In FIG. 8, there is only one IF frequency and one local oscillator 26, joined by switch 33 to the mixer. When the switch is closed, the radar performs normal skin-tracking functions. When the switch 33 is open the IF amplifier passes only $fr \pm fm$, where $fm$ equals the IF frequency, and hence the radar is sensitive only to a beacon with an oscillator 4 tuned to this IF frequency.

As stated above, other possible combinations of elements can be employed to make a radar unit capble of tracking only a frequency-shift reflector of the type set forth in the present invention or capable of tracking either that type of beacon, or skin tracking, or both.

An illustrative example, a one-foot diameter Luneberg lens with four frequency-shift unflared waveguide horns provides a satisfactory angular coverage of about 16" when illuminated by an X-band radar operating at approximately 9000 megacycles.

I do not limit my invention to the exact forms shown in the drawings, for obviously changes may be made therein within the scope of the following claims.

I claim:
1. A frequency-shift reflector assembly for receiving and reflecting incident high-frequency electromagnetic radiation, comprising the combination of a plurality of waveguides comprising reflectors and each having an open end, and the waveguides being disposed with their open ends in mutually contiguous relation and with their axes meeting at a common point; electrical switching means connected across each waveguide and spaced from its ends for selectively short-circuiting the waveguide to change its reflectivity; a source of radio-frequency connected with and actuating said switching means in unison at said radio frequency rate; and radiation focusing means disposed opposite said open ends of the waveguides near said common point and focusing said incident radiation into a focal area located substantially at one of said open ends depending upon the angle of incidence of the radiation on the focusing means.

2. In an assembly as set forth in claim 1, said radiation focusing means comprising a reflector dish having a focal zone disposed coincident with said open ends of the waveguides.

3. In an assembly as set forth in claim 1, the aperture of the focusing means being large as compared with the open end of a waveguide and being larger than the composite of the open ends of all of the waveguides.

4. A frequency-shift reflector assembly for receiving and reflecting incident high-frequency electromagnetic radiation, comprising the combination of a plurality of waveguides comprising reflectors and having an open end, and the waveguides being disposed with their open ends in mutually contiguous relation and with their axes meeting a common point; electrical switching means connected across each waveguide and spaced from its ends for selectively short-circuiting the waveguide to change its reflectivity; a source of radio frequency connected with and actuating said switching means in unison at said radio frequency rate; and radiation focusing means comprising a spherical Luneberg-type lens for focusing a collimated radiation incident upon the lens on one side to a point on the lens on the opposite side, the lens being disposed opposite the open ends of said waveguides with its center located at said common point and being of such diameter as to place the said open ends substantially at the focus of the lens.

References Cited in the file of this patent
UNITED STATES PATENTS 2,850,728    Wright et al. _____ Sept. 2, 1958
2,917,740    Ramsay _____ Dec. 15, 1959